United States Patent [19]
Green et al.

[11] Patent Number: 5,588,673
[45] Date of Patent: Dec. 31, 1996

[54] MEMBRANE SWITCH FOR USE OVER A STEERING WHEEL AIRBAG ASSEMBLY

[75] Inventors: Mark Green, Eden Prairie; Robert B. Hartline, Richfield, both of Minn.

[73] Assignee: The Bergquist Company, Minneapolis, Minn.

[21] Appl. No.: 189,936

[22] Filed: Feb. 1, 1994

[51] Int. Cl.$^6$ .................................................. B60R 21/20
[52] U.S. Cl. ...................... 280/731; 200/61.54; 200/5 A
[58] Field of Search ............................. 280/731, 728.1, 280/728.3; 200/61.54, 86 R; 406/685.1

[56] References Cited

U.S. PATENT DOCUMENTS

| | | | |
|---|---|---|---|
| 1,992,929 | 2/1935 | Fator | 200/5 A |
| 2,562,185 | 7/1951 | Gross | 200/513 |
| 3,722,886 | 3/1973 | Wikkerink et al. | 200/86 R |
| 3,821,500 | 6/1974 | Newman | 200/86 R |
| 4,066,451 | 1/1978 | White et al. | 200/86 R X |
| 4,071,718 | 1/1978 | Harden | 200/512 |
| 4,356,366 | 10/1982 | Harper et al. | 200/159 B |
| 4,375,595 | 3/1983 | Lee | 200/5 A |
| 4,376,238 | 3/1983 | Martin | 200/159 B |
| 4,525,606 | 6/1985 | Sado | 200/86 R X |
| 4,602,135 | 2/1986 | Phalen | 200/86 R X |
| 4,612,425 | 9/1986 | Kanai et al. | 240/61.56 |
| 4,714,806 | 12/1987 | Inui et al. | 200/61.55 |
| 4,882,460 | 11/1989 | Mertens | 200/512 |
| 4,934,735 | 6/1990 | Embach | 280/731 |
| 5,002,306 | 3/1991 | Hiramitsu et al. | 280/731 |
| 5,085,462 | 2/1992 | Gualtier | 200/61.54 |
| 5,136,131 | 8/1992 | Komaki | 200/516 |
| 5,198,629 | 3/1993 | Hayashi et al. | 200/61.34 |
| 5,265,904 | 11/1993 | Shelton et al. | 280/231 |
| 5,338,059 | 8/1994 | Inoue et al. | 200/61.54 X |
| 5,344,819 | 3/1995 | Lang et al. | 280/731 X |
| 5,401,922 | 3/1995 | Aota | 200/5 A |

FOREIGN PATENT DOCUMENTS 0049672   12/1934   Denmark .............................. 200/86 R

*Primary Examiner*—Christopher P. Ellis
*Attorney, Agent, or Firm*—Haugen and Nikolai, PA

[57] ABSTRACT

A low profile membrane switch adapted for use over an automobile steering wheel airbag assembly for actuating a horn. The low profile membrane switch is comprised of an opposing pair of flexible electrodes separated by a dielectric layer. The dielectric layer has a unique pattern defining opposing electrode contact portions. A plurality of integral outwardly-extending protrusions are screen printed on the exterior surface of each flexible electrode, one over each of the opposing contact portions. These protrusions help concentrate an applied force to bring the respective electrode contact portions together to make electrical contact with the other. The opposing contact portions are defined by the dielectric pattern, and have a high density to insure redundancy and closure of the switch when one depresses the membrane switch with one's hand, and to insure the switch does not inadvertently close when flexed. An applied force of as little as four pounds causes closure of the membrane switch, even when positioned over a resilient airbag device.

18 Claims, 2 Drawing Sheets

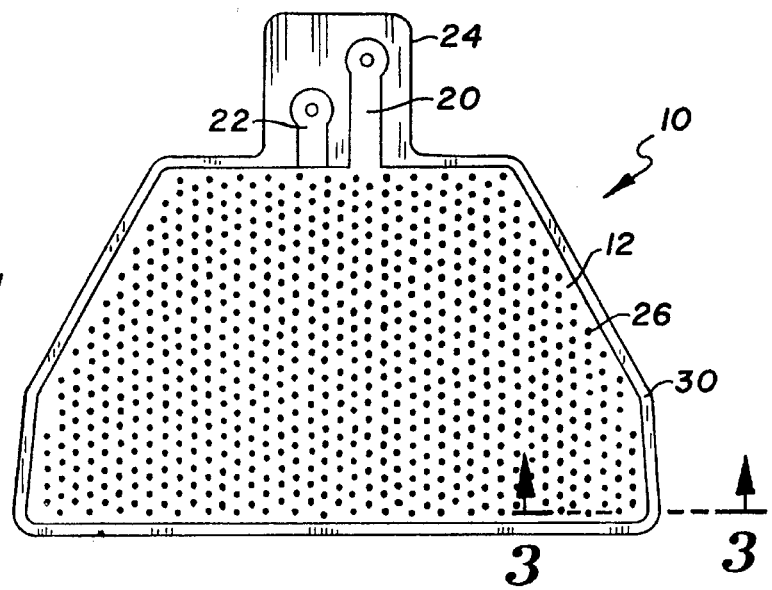
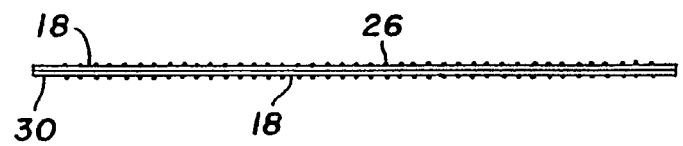
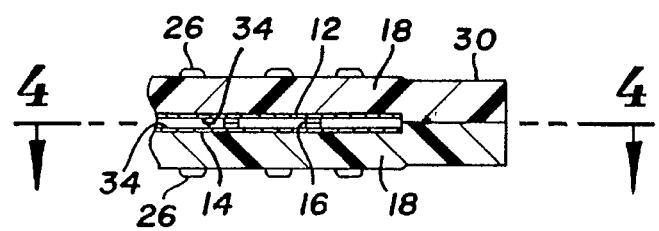
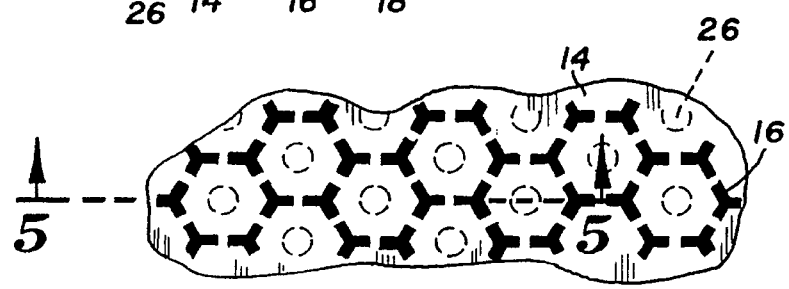
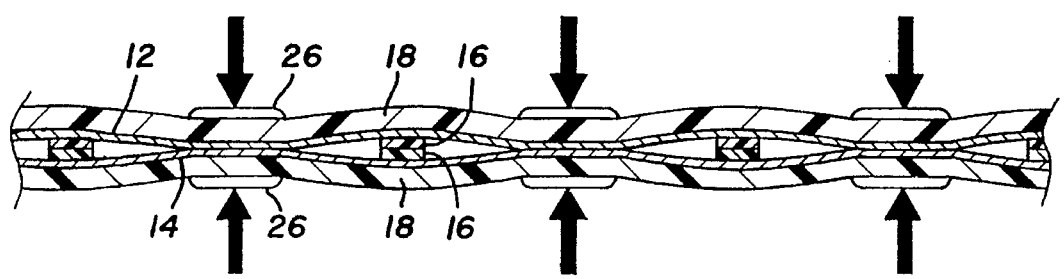

MEMBRANE SWITCH FOR USE OVER A STEERING WHEEL AIRBAG ASSEMBLY

BACKGROUND OF THE INVENTION

I. Field of the Invention

This invention relates generally to switches positioned over resilient steering-wheel airbags for activating automobile horns, and more particularly, to an improved, inexpensive membrane switch which requires a reduced amount of applied force to obtain a good electrical closure of the switch.

II. Discussion of the Prior Art

Automobile horns are typically located in the engine compartment, and are remotely controlled and activated by one or more switches positioned on the automobile steering wheel. These switches are typically provided at the center or hub of the steering wheel. Thus, they are conveniently located and accessible to the driver when honking the automobile horn is necessitated. Automobiles manufactured today are usually provided with a driver's side airbag, which will be a mandatory device shortly. This airbag is stored in the steering wheel hub, and is adapted to inflate quickly upon impact. Accordingly, the airbag cover needs to be resilient so that it won't obstruct proper inflation of the airbag. The switches implemented for activating the horn are required to attain a good electrical closure when only a moderate amount of force is applied to the switch. This specification is necessary so a driver does not need to struggle to honk the horn during an emergency, such as to avoid an accident, warn a child approaching the street, or frightening away animals along the roadside.

The engineering dilemma automotive manufacturers face is providing an effective horn switch across a resilient surface comprising an airbag assembly. This is because a firm supporting surface for the switch cannot be placed across the airbag assembly without creating a detriment to operation of the airbag assembly. Accordingly, the switch needs to be capable of providing a good electrical closure when placed across a resilient airbag assembly, even when only a moderate amount of force is applied thereon. Automotive manufacturers today are now requiring that as little as four pounds of force applied to the switch should create a good electrical closure of the switch. To date, meeting such a difficult requirement has necessitated designing complicated and expensive membrane switches to be placed across the resilient airbag surface.

U.S. Pat. No. 5,265,904 to Shelton et al. teaches an airbag cover with an integral horn switch. Alternating strips of positive and negative horn contacts are provided on the common inner surface of the outer horn cover. These strips are positioned over and opposed from a conductive layer positioned across the airbag. As the outer horn cover is depressed, the alternating strips of positive and negative horn contacts are electrically connected via the inner conductive layer, thus forming a closed switch. The inner and outer covers supporting the contact strips and the conductive layer are both resilient, wherein the inner cover is positioned across a resilient airbag. Accordingly, a relatively large force needs to be applied to the outer cover to cause the alternating contacts to each make a good electrical contact with the inner conductive layer.

U.S. Pat. No. 5,198,629 to Hayashi et al. teaches a steering wheel with a molded membrane switch positioned across a steering wheel airbag device. Referring to FIG. 3, a pair of switches are formed by three conductive layers sandwiching two layers of interlaced dielectric members. Closure of either of the membrane switches can be used to sound the horn. As shown in FIGS. 4 and 5, a plot pattern of insulator ink is defined on the outer contact members such that they are sandwiched between the contact members, and thus, serve as both insulators and pressure concentrating members. The inner conductive layer is manufactured free of any plot pattern, and can be brought into electrical contact with either of the outer conductive layers depending on where the external force us applied.

U.S. Pat. No. 5,085,462 to Gualtier teaches a membrane switch positioned across a steering wheel airbag module. The lower electrode is shown to include an upwardly projecting contact portion extending inwardly into a respective aperture of a foam insulator. A relatively large amount of force needs to be applied to bring the opposing electrodes into electrical contact with one another. In FIG. 13, the outer cover includes a plurality of downwardly projecting nodes which help reduce the required amount of pressure necessary to close the switch. However, in that these nodes are formed integral to the cover, and separate from the switch itself, extensive care needs to be taken that the nodes are precisely aligned above the upper electrode during final assembly. This alignment is tedious, time consuming and expensive since these nodes are not integral to one of the conductive layers.

Other steering wheel assemblies seen to include a membrane switch positioned across an airbag assembly are disclosed in U.S. Pat. Nos. 5,002,306 to Hiramitsu et al., and 4,934,735 to Embach. Each of these devices requires a relatively large amount of force to be applied to adequately bring the opposing electrodes into contact with one another to close a switch. Moreover, due to the positioning of the membrane switches, a driver needs to pay particular attention to the location of these switches, and cannot indiscriminently depress any portion of the steering wheel hub one chooses to activate the horn. This can be dangerous in times of an emergency, such as when one needs to immediately activate the horn without looking at the steering wheel to avoid an accident, or gain the attention of a child or animal. U.S. Pat. No. 4,714,806 to Nuiinui et al. teaches a tape switch assembly for use with an automobile steering wheel. This device includes a rigid bottom layer, and is not adapted to be positioned across an airbag or a resilient surface.

An improved membrane switch for an automobile horn which can be provided over a resilient airbag on a steering wheel is desirable. Such a switch should effectively close with a minimal amount of force applied thereto while positioned over a resilient surface, such as an airbag assembly.

OBJECTS OF THE INVENTION

It is accordingly a principle object of the present invention to provide an improved membrane switch adaptable to a steering wheel hub.

A further object of the present invention is to provide an improved membrane switch which can be easily closed to activate the horn with a minimal amount of applied pressure even when the switch is spread across a supporting resilient surface, such as an airbag assembly.

Still yet a further object of the present invention is to provide an improved membrane switch with a plurality of switching contacts to provide an inherent redundancy, these switching contacts being provided in a high density, wherein closure of any one contact closes the switch to activate the horn.

3

Another object of the present invention is to provide a low profile plate-like switch which consumes a reduced amount of space, and which is easy and inexpensive to make.

Other objects, features and advantages of the present invention will become apparent to those skilled in the art through the Description of the Preferred Embodiment, Claims, and drawings herein wherein like numerals refer to like elements.

SUMMARY OF THE INVENTION

The foregoing objects and advantages of the present invention are achieved by providing a membrane switch comprising a pair of flexible, spaced, opposing planar conductive electrodes with a plurality of outwardly-extending pressure-concentration protrusions integrally defined on an outer surface of at least one of the electrodes. A generally planar dielectric member is disposed between the opposing electrodes. This dielectric member is uniquely designed to have a pattern defining a plurality of opposing electrode contact portions, these portions being unobstructed from the other due to the design of the dielectric. The protrusions are screen printed on at least one electrode outer surface, one above each electrode contact portion. Pressure exerted on these protrusions concentrates the applied force to the corresponding opposing electrode contact portions to facilitate making an electrical contact. In other words, the dielectric member maintains a spacing of opposing conductive electrodes, while defining a plurality of opposing electrode contact portions which can be brought into electrical contact with one another when force is exerted on the protrusions provided above and below these contact portions.

In the preferred embodiment, the dielectric pattern comprises a plurality of adjacent, hollow, geometric shapes. Opposing electrode contact portions are defined within these geometric shapes. Ideally, the dielectric pattern comprises a plurality of hexagons to form a honeycomb-like pattern. Thus, the opposing electrodes remain spaced apart from one another by the honeycomb-like dielectric, but can be brought into electrical contact with one another, within the center of the hexagon, upon applying a force to the protrusions defined exterior of the flexible electrode. In a preferred embodiment, a plurality of protrusions are defined on the exterior side of each flexible electrode, one protrusion being provided adjacent each of the opposing contact portions, to concentrate applied pressure to the flexible electrodes when a switch closure is intended.

The design of the honeycomb pattern is of high density, such that the switch can be flexed about the airbag assembly without causing closure of the switch. In addition, the high density arrangement of protrusions, and corresponding contact portions, facilitates redundancy. Namely, pressure exerted by a finger or palm on one surface of the planar membrane switch will cause a plurality of opposing contact portions to make electrical contact with one another, although only one electrical contact is required to close the switch and activate the horn. Moreover, the membrane switch is equally sensitive about the entire planar surface, and does not need to be depressed at the center of the switch to easily close the switch. This feature reduces the frustration and effort required of the driver to quickly find and effectively close the switch to honk the horn.

The membrane switch has a low profile, and is generally plate-like in shape. Thus, it can be conveniently adapted across an airbag assembly stored in the steering wheel hub. This reliable switch is easily manufactured from a pair of opposing copper plates, however, silver ink deposit conductive layers could be provided as well. The pressure concentration dots are deposited as a layer on the laminate outer surfaces using screen printing techniques, these electrodes then being laminated. The dots are easily aligned over the electrode contact portions defined by the patterned dielectric layer using registration targets during manufacturing.

BRIEF DESCRIPTION OF THE DRAWINGS

FIG. 1 is a top view of a membrane switch according to the preferred embodiment of the present invention illustrating a high-density plurality of pressure concentration dots integrally defined on the outer surface of the top flexible electrode, wherein a pair of switch leads are provided, one coupled to each of the pair of flexible electrodes;

FIG. 2 is a side or edge view of the membrane switch shown in FIG. 1 illustrating the low-profile design of the flexible membrane switch;

FIG. 3 is a partial sectional view taken at 3—3 in FIG. 1 illustrating the pair of opposing, flexible, planar electrode members spaced from one another by a pair of identical, aligned, patterned dielectric members, wherein each dielectric member is patterned to maintain spacing between electrodes while defining a plurality of opposing electrode contact portions;

FIG. 4 is a sectional view taken at 4—4 in FIG. 3 illustrating the pattern of one dielectric member comprising a plurality of adjacent, hollow, geometric shapes, such as hexagons, wherein opposing electrode contact portions are defined within each hexagon and between the exterior protrusions or dots defined on the exterior surface of each electrode;

FIG. 5 is an enlarged sectional view taken at 4—4 in FIG. 1 with pressure applied to the membrane switch protrusions to cause the adjacent and corresponding, opposing, electrode contact portions to come into electrical contact with one another to close the switch;

DESCRIPTION OF THE PREFERRED EMBODIMENT

Figure 6:
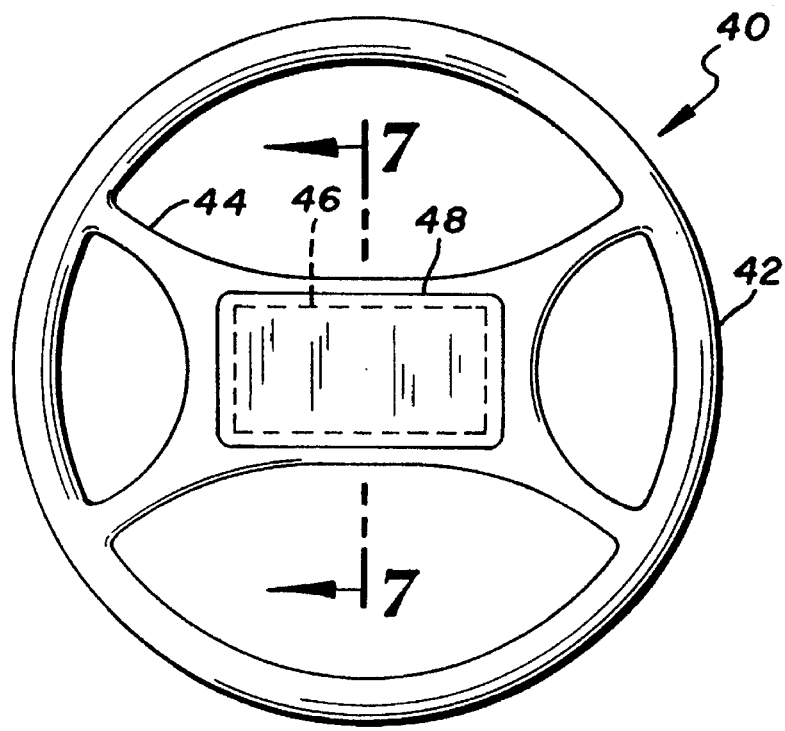
FIG. 6 is a top view of a conventional steering wheel having an airbag (not shown) stored in the hub.

Referring now to FIG. 1, a low profile membrane switch according to the preferred embodiment of the present invention is generally shown at 10. Membrane switch 10 is seen to be comprised of a pair of opposing, flexible, planar conductive electrodes 12 and 14 which are spatially and electrically isolated from one another by a non-conducting planar dielectric member 16. Each of electrodes 12 and 14 are externally laminated with a transparent, non-conductive, layer 18 superimposed over each electrode. (See FIG. 3). A top switch lead 20 is electrically connected to, and extends from one edge of, top electrode 12, this lead also being laminated and extending along the lower surface of respective layer 18. A bottom switch lead 22 is electrically connected to, and extends from, bottom flexible electrode 14 along an inner surface of the other respective layer 18. Each of leads 20 and 22 extend along an integral tab portion 24 of each layer 18, and are laterally offset so that they are electrically isolated from one another between layers 18.

Leads 20 and 22 serve as the electrical switch pads for membrane switch 10. Switch 10 has a generally trapezoidal shape corresponding to the airbag assembly (see FIG. 7), however, round switches could be created as well and, hence, limitation to trapezoidal-shaped switches is not to be inferred.

Each layer 18 extends beyond the perimeter of the respective electrode, and is heat sealed to the other about the perimeter of each flexible electrode to form a rim 30. However, pressure-adhesives could be used as well. Rim 30 provides a rigid protective surface about the switch perimeter. A plurality of outwardly-extending pressure concentration protrusions or dots 26 are integrally provided on the exterior surface of each electrode non-conductive layer 18. These protrusions are screen printed in high density onto each non-conductive layer 18, one dot being provided over (under) each electrode contact region 34 formed by the dielectric layer (see FIG. 3). FIG. 2 illustrates the low profile feature of membrane switch 10, which has an overall thickness of approximately 0.02 inches.

Referring now to FIG. 3, a sectional view taken along line 3—3 in FIG. 1 is provided showing the opposing, flexible, electrodes 12 and 14 spatially separated and electrically isolated from one another by a pair of identical dielectric members 16. Referring to FIG. 4, one dielectric member 16 is shown to have a high-density pattern comprised of a plurality of adjacent, interlaced, geometric shapes, shown as hexagons. The perimeter of these hexagon shapes maintain spacing of the flexible electrodes 12 and 14. The center of these hexagon shapes are void to define a plurality of opposing electrode contact portions 34, as shown in FIG. 3. One protrusion or dot 26 is screen printed on the exterior surface of each non-conductive layer 18, one above and one below the center of each hexagon as shown in phantom in FIG. 4.

Referring to FIG. 5, when pressure is applied to protrusions 26, such as by the driver's hand or fingers the corresponding opposing contact portions 34 of electrodes 12 and 14 are brought into a good electrical contact with one another. This causes the closure of membrane switch 10, and establishes a conductive path between electrode leads 20 and 22. (See FIG. 1). The high-density dielectric pattern maintains spacing of the electrodes about the perimeter of the hexagon shapes, while facilitating the selective flexing of each electrode 12 and 14 within the hexagon void to establish an electrical contact. The high-density pattern of the dielectric sheet 16 also allows the switch to be flexed, such as about an airbag assembly, without inadvertently causing a closure of the switch 10.

In the preferred embodiment, the spacing of the hexagons forming the dielectric member, and the corresponding dots 26, is in the order of 0.13 inches. Therefore, a high concentration of opposing electrode contact areas 34 and associated dots 26 is provided. Typically, when the palm of one's hand depresses upon the exterior surface of switch 10, pressure will be exerted to at least fifty dots 26, causing fifty associated pairs of opposing contact portions 34 to close. Thus, a good electrical contact is provided between electrode leads 20 and 22, and redundancy is established.

Each flexible electrode 12 and 14 is preferably comprised of a copper foil. Copper can withstand thousands of switch closures without depreciation in performance during high power applications. A thin silver ink deposit conductive layer could also be used to save costs, however, silver ink deposit layers are more applicable to lower power applications.

While a plurality of adjacent hexagon shapes are preferred to form the pattern of dielectric layers 16, it is to be recognized that other shapes such as pentagons, rectangles, triangles etc. could be implemented as well with the corresponding dots or protrusions 16 defined over and below the center of each geographic shape, similar to that shown in FIG. 4. A hexagon shape is preferred because of its symmetry, and it reduces the resistance for flexing each electrode 12 and 14 when flexed for a given unit area of dielectric.

Referring now to FIG. 6, a conventional steering wheel is generally shown at 40. Wheel 40 has a rim 42 and a hub portion 44 as shown. An airbag assembly 46 shown in phantom is stored within hub 44, and is protected by a flexible airbag cover shown at 48.

Figure 7:
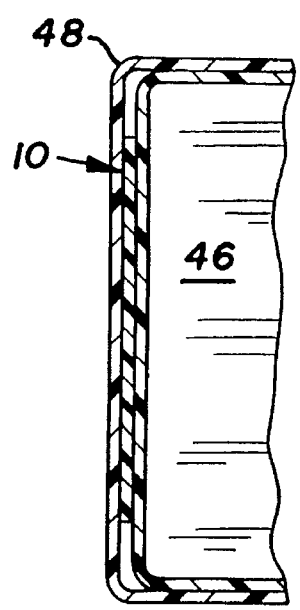
FIG. 7 is a sectional view taken along line 7—7 in FIG. 6 illustrating the membrane switch positioned between the supporting resilient airbag assembly and the resilient airbag cover.

Referring to FIG. 7, a sectional view taken along line 7—7 in FIG. 6 is shown illustrating membrane switch 10 sandwiched between supporting resilient cover 48 and airbag assembly 46. Providing an airbag assembly within the steering wheel hub and providing a resilient cover, such as that shown in FIGS. 6 and 7, is well known in the art and will not be discussed further. However, the implementation of the low profile membrane switch 10 according to the preferred embodiment of the present invention is ideally suited to be secured between the supporting airbag assembly and its cover due to its low profile design, and further, because it does not interfere with proper inflation of the airbag device upon impact.

When a small amount of force is applied to resilient airbag cover 48, switch 10 is closed. This is because the integral pressure concentration dots 26 on both outer surfaces of planar switch 10 help concentrate the applied forces to the opposing contact portions 34. Each of the dots 26 are engaged with a resilient surface, namely, cover 48 and supporting airbag assembly 46. However, an applied pressure of as little as four pounds is sufficient to cause closure of one or more contact regions 34. Closure of the switch is detected by the horn activation circuitry (not shown) having a conventional design.

In the preferred embodiment, membrane switch 10 is preferably disposed between the airbag cover and the airbag assembly itself, as shown. However, it is to be recognized that membrane switch could also be provided exterior and over cover 48, if desired.

As airbag cover 48 and airbag assembly 48 usually have curved outer surfaces, membrane switch 10 is curved as well when assembled into the steering wheel 40. However, due to the high density arrangement of the hexagons forming dielectric layers 16, flexure of switch 10 will not cause unintended closure of the switch 10. Accordingly, the dielectric pattern provides two functions. First, to provide an insulating spacing and contact surfaces for the conductive electrodes, and secondly, to prevent accidental closure of the switch when flexed as it is finally assembled into the steering wheel hub.

In summary, a low profile membrane switch adapted to be placed over a resilient surface such as an airbag assembly, and below a resilient airbag cover, is disclosed. An applied force of as little as four pounds is sufficient to cause closure of the switch. This is due to the integral pressure concentration dots or protrusions screen printed upon each of the outer surfaces of the membrane switch. While providing pressure concentration dots on only one surface of the switch is advantageous, it is preferable to provide these pressure concentration dots on both external major surfaces. The switch is reliable, and can have a large pressure-receiving surface area so that pressure applied to any portion of the switch exterior surface creates a good electrical contact. Due to the high density arrangement of the dots and associated hexagon-shaped dielectric sheets, redundancy is provided to insure reliable closure of the switch. The unique pattern of the dielectric member insures the flexible electrodes remain electrically isolated from one another until the surface of one electrode is depressed, even when the switch is flexed once assembled into the steering wheel. The switch is easy and inexpensive to manufacture since the copper electrodes can be etched from a conventional foil, and no special texturing of electrodes is required. The hexagon-shaped dielectric members are screen printed to the inner respective surfaces of each electrode. The pressure concentration dots are also applied to the laminate using screen printing, before the switch electrode outer surfaces have been laminated. Alignment of the hexagon-shaped dielectric members, and the pressure concentration dots, is easy to accomplish by registration targets employed during screening when manufactured. As only a single pair of copper electrodes are required, the material costs for the present invention is small as well.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

We claim:

1. A membrane switch, comprising:

a pair of flexible, opposing, planar conductive electrodes electrically isolated from one another, each said opposing electrode having an outer surface and an inner surface, said inner surfaces opposing one another, each of said outer surfaces having a continuous flexible non-conductive layer disposed thereon;

a generally planar dielectric member disposed between said opposing electrodes having a high-density pattern of interlaced wall portions defining a plurality of geometric shapes having an axis, said geometric shapes defining a plurality of opposing electrode contact portions on said inner surfaces of said opposing electrodes which remain unobstructed by said dielectric member; and a plurality of outwardly extending protrusions disposed as a high density pattern on the outer surface of each said nonconductive layer, each of said plurality of outwardly extending protrusions having an axis and being arranged in generally axially aligned relation with each of said plurality of opposing electrode contact portions, such that pressure exerted on each said outwardly extending protrusions causes the correspondingly aligned, opposing electrode contact portions to make electrical contact with one another.

2. The switch as specified in claim 1 wherein said plurality of geometric shapes comprise hexagons to form a honeycomb-like pattern.

3. The switch as specified in claim 1 wherein said outwardly extending protrusion is comprised of a circular dot.

4. In combination, a horn for generating an audio output, and a switch coupled to said horn for activating said horn, said switch comprising:

a pair of flexible, opposing, planar conductive electrodes electrically isolated from one another, each said electrode having an outer surface and an inner surface, said outer surfaces having a continuous flexible non-conductive layer disposed thereon, said inner surfaces of said electrodes opposing one another;

a generally planar dielectric member disposed between said opposing electrodes and having a pattern of interlaced wall portions defining a plurality of geometric shapes between said electrodes, wherein a plurality of opposing electrode contact portions are defined on each of said inner surfaces of said electrodes, each said opposing electrode contact portion having an axis and being defined within each of said plurality of geometric shapes; and a plurality of outwardly extending protrusions defined on the outer surface of each of said non-conductive layers, with each of said protrusions having an axis, each of said plurality of outwardly extending protrusions being in substantially axially aligned relationship with each one of said opposing electrode contact portions, such that pressure exerted on each said outwardly extending protrusions causes said corresponding, opposing, electrode contact portions of said inner surfaces of said electrodes to make electrical contact with one another.

5. The switch as specified in claim 4 wherein said plurality of geometric shapes comprise hexagons to form a honeycomb-like pattern.

6. In combination, a steering wheel having a resilient airbag assembly disposed therein, a resilient airbag cover for covering said airbag assembly, and a membrane switch disposed in a covering relation over said airbag assembly and under said airbag cover, said switch comprising:

a pair of flexible, opposing, planar conductive electrodes electrically isolated from one another, each said electrode having an outer surface and an inner surface, said inner surfaces opposing one another to form an electrode pair, said outer surfaces covered by a continuous flexible non-conductive layer;

a generally planar dielectric member disposed between the inner surfaces of said opposing electrodes and having a pattern defining a plurality of coaxially arranged opposing electrode contact portions on said inner surfaces of said electrodes which remain unobstructed by said dielectric member; and a plurality of outwardly extending generally planar disc protrusions disposed on the outer surface of each of said continuous non-conductive layers, with each one pair of outwardly extending protrusions being provided in coaxially aligned relation with each mating pair of said electrode contact portions, such that pressure exerted on said outwardly extending protrusions causes said corresponding, opposing, electrode contact portions to make electrical contact with one another.

7. In combination, a steering wheel having a resilient airbag assembly disposed therein, a resilient airbag cover for covering said airbag assembly, and a membrane switch disposed in a covering relation over said airbag assembly and under said airbag cover, said switch comprising:

a pair of flexible, opposing, planar conductive electrodes electrically isolated from one another, each said electrode having an outer surface and an inner surface, said outer surfaces having a continuous flexible non-conductive film layer disposed thereon, said inner electrode surfaces opposing one another in spaced apart relationship to create said electrically isolated arrangement;

a generally planar dielectric member disposed between said opposing electrodes having a pattern of cavities defining a plurality of adjacent geometric shapes, said cavities having an axis and defining a plurality of opposing electrode contact portions which are held in said spaced apart relationship by said dielectric member and which remain unobstructed by said dielectric member; and a plurality of outwardly extending protrusions disposed on the outer surface of each said non-conductive layer each having an axis, each said plurality of outwardly extending protrusions provided adjacent each said opposing electrode contact portions and having their axes arranged coaxially with the axis of their adjacent cavities, such that pressure exerted on said outwardly extending protrusions causes the corresponding opposing electrode contact portions to make electrical contact with one another.

8. The switch as specified in claim 7 wherein said plurality of geometric shapes comprise hexagons to form a honeycomb-like pattern.

9. The switch as specified in claim 6 wherein said dielectric member pattern comprises a plurality of interlaced wall portions forming a plurality of adjacent geometric shapes, said electrode contact portions being defined within said geometric shape.

10. The switch as specified in claim 9 wherein said electrode contact portions are defined within said plurality of geometric shape cavities.

11. The switch as specified in claim 10 wherein said dielectric member pattern comprises a plurality of hexagons to form a honeycomb-like pattern.

12. The switch as specified in claim 9 wherein said protrusions are spaced no more than 0.20 inches from one another.

13. A low profile membrane switch, comprising:

a pair of generally planar, flexible conductive electrodes, said electrodes being electrically isolated from one another and positioned in a substantially parallel relationship, each of said electrodes having an outer surface and an inner surface, wherein said inner surfaces are positioned in a confronting relationship one of the other and said outer surfaces are covered with a non-conductive film to form a laminate structure;

a generally planar dielectric member disposed between said electrodes, said dielectric member having a high-density pattern of interlaced and adjacent hollow geometric shapes, said hollow geometric shapes defining a plurality of pairs of opposing electrode contact portions on said inner surfaces of said electrodes, said hollow geometric shapes comprising hexagons to form a honeycomb-like pattern within said dielectric member;

a plurality of outwardly extending protrusions disposed as a high-density pattern in coaxial relationship on the outer surface of each said non-conductive films to define a plurality of pairs of opposing outwardly extending protrusions, each of said plurality of pairs of opposing electrode contact portions being substantially axially aligned with and disposed between each of said plurality of pairs of opposing outwardly extending protrusions, whereby the application of force to one of said outwardly extending protrusions causes the correspondingly paired, opposing outwardly extending protrusion to move toward a mid-point between said electrodes such that said opposing electrode contact portions converge and make contact at said mid-point.

14. The switch as defined in claim 1 wherein said generally planar dielectric member comprises a layer of dielectric material bonded to the surface of each of said opposing electrodes and being arranged in mutually opposed registration, one to another.

15. The switch as defined in claim 6 wherein said generally planar dielectric member comprises a layer of dielectric material bonded to the surface of each of said opposing electrodes and being arranged in mutually opposed registration, one to another.

16. The switch as defined in claim 6 wherein said generally planar dielectric member comprises a layer of dielectric material bonded to the surface of each of said opposing electrodes and being arranged in mutually opposed registration, one to another.

17. The switch as defined in claim 9 herein said generally planar dielectric member comprises a layer of dielectric material bonded to the surface of each of said opposing electrodes and being arranged in mutually opposed registration, one to another.

18. The switch as defined in claim 13 wherein said generally planar dielectric member comprises a layer of dielectric material bonded to the surface of each of said opposing electrodes and being arranged in mutually opposed registration, one to another.

* * * * *

UNITED STATES PATENT AND TRADEMARK OFFICE
CERTIFICATE OF CORRECTION

PATENT NO.   : 5,588,673
DATED        : December 31, 1996
INVENTOR(S)  : Mark Green et al.

It is certified that error appears in the above-indentified patent and that said Letters Patent is hereby corrected as shown below:

Column 8, line 45, delete "one".

Column 9, line 9, delete "plurality of --.

Column 9, line 31, the dependency of Claim 12 should read -- Claim 7 --.

Column 9, line 40, "one of the" should read -- one to the --.

Column 10, line 25, the dependency of Claim 15 should read -- Claim 4 --.

Column 10, line 35, "claim 9 herein" should read -- claim 9 wherein --.

Signed and Sealed this

Eighth Day of April, 1997

*Attest:*

BRUCE LEHMAN

*Attesting Officer*        *Commissioner of Patents and Trademarks*